United States Patent
Audette

(10) Patent No.: US 9,578,796 B2
(45) Date of Patent: Feb. 28, 2017

(54) PIVOTALLY RETRACTABLE SEED PLANTING APPARATUS AND METHOD

(71) Applicant: INDUSTRIE AULARI INC., St-Barnabé-Sud (CA)

(72) Inventor: Patrick Audette, Saint-Jude (CA)

(73) Assignee: INDUSTRIE AULARI INC., Saint-Barnabe-Sud (CA)

( * ) Notice: Subject to any disclaimer, the term of this patent is extended or adjusted under 35 U.S.C. 154(b) by 89 days.

(21) Appl. No.: 14/374,624

(22) PCT Filed: Jan. 25, 2013

(86) PCT No.: PCT/CA2013/000072
§ 371 (c)(1),
(2) Date: Jul. 25, 2014

(87) PCT Pub. No.: WO2013/110184
PCT Pub. Date: Aug. 1, 2013

(65) Prior Publication Data
US 2015/0033995 A1    Feb. 5, 2015

Related U.S. Application Data

(60) Provisional application No. 61/590,359, filed on Jan. 25, 2012.

(51) Int. Cl.
*A01B 73/06* (2006.01)
*A01C 7/20* (2006.01)

(52) U.S. Cl.
CPC ............ *A01B 73/067* (2013.01); *A01C 7/208* (2013.01)

(58) Field of Classification Search
CPC ....... A01B 73/067; A01B 73/06; A01B 73/02; A01B 73/00; A01C 7/208; A01C 7/20; A01C 7/00
See application file for complete search history.

(56) References Cited

U.S. PATENT DOCUMENTS

| | | |
|---|---|---|
| 5,715,893 A | 2/1998 | Houck |
| 7,430,972 B2 | 10/2008 | Audette |
| 2011/0290515 A1 | 12/2011 | Yuen |
| 2011/0315410 A1 | 12/2011 | Kinzenbaw |

*Primary Examiner* — Christopher J Novosad
(74) *Attorney, Agent, or Firm* — Brouillette Legal Inc.; Robert Brouillette

(57) ABSTRACT

A pivotally retractable seed planting apparatus that comprises a main frame assembly, a pivoting transverse member, a pivotally retractable transverse member, a lift system, a set of retractable wheels, a plurality of set of transverse member wheels, a hitching pole member, a central transverse member and a set of frame wheels.

14 Claims, 18 Drawing Sheets

PIVOTALLY RETRACTABLE SEED PLANTING APPARATUS AND METHOD

CROSS-REFERENCE TO RELATED APPLICATIONS

The present patent application claims the benefits of priority of U.S. Provisional Patent Application No. 61/590,359, entitled "Pivotally Retractable Seed Planting Apparatus" and filed at the United States Patent and Trademark Office on Jan. 25, 2012. The content of which is incorporated herein by reference.

BACKGROUND OF THE INVENTION

Traditionally, seed planting apparatus had a fixed frame having a series of seed planting units perpendicularly positioned to the planting direction. Such seed planting apparatus must be towed by a tractor using a hitching pole. Over the years, in order to optimize the seeding process and as the power of the tractor engines increased, more seed planting units have been added to the seed planting apparatus, thus increasing the width of the planters. As the areas covered by cities have increased or as new land have been developed or acquired by farmers, the travel distance between different fields of a farm have considerably increased, thus increasing the need for a seed planting apparatus being able to travel over existing roads.

In order to overcome such problems, pivotally foldable seed planting apparatus have been developed. Such apparatus typically comprises one or two longitudinal members holding one or more seed planting units and one or more fertilizer discs. The members may be pivoted around a vertical axis position within the center of the frame of the seed planting apparatus, thus considerably reducing the width of the seed planting apparatus.

U.S. Pat. No. 7,430,972 issued Oct. 7, 2008 to the inventor of the present invention shows a seed planter allowing the seed planters unit supports to be folded along the frame of the seed planter apparatus. The reduced width of the described seed planter facilitates public road travel in countries where road are large, such as in North America, but make it impracticable on narrower road such as in European or Asiatic countries.

To enact the Agriculture Agreement adopted by the World Trading Organization, many countries have agreed to reduce the subsidizing offered to farmers. As a consequence, farmer will need to improve the efficiency of their agricultural process and to reduce the expenses allocated to equipment and employees. However, even if a pivotally foldable seed planting apparatus would avoid a farmer to buy multiple seed planters by allowing transport between the different fields, in many countries, a large proportion of roads are still too narrow to allow a folded seed planting apparatus to freely travel.

There is therefore a need for a seed planting apparatus having foldable members and having a width allowing the apparatus to travel on most of the roads while folded.

SUMMARY OF THE INVENTION

The aforesaid and other objectives of the present invention are realized by generally providing a pivotally retractable seed planting apparatus that comprises a frame, a pivoting transverse member, a pivotally retractable transverse member, a lift system, a set of retractable wheels, a plurality of set of transverse member wheels, a hitching pole member, a central transverse member and a set of frame wheels.

A pivotally retractable seed planting apparatus may be used to plant in areas where road are narrow or where geographical features or relief of a field does not allow a non-foldable or larger retractable seed planting apparatus to be used. A pivotally retractable seed planting apparatus may be used through at least four modes of operation, the transportation mode, the collapsing mode, the operating mode and the expanding mode.

During the transportation mode, a pivotally retractable transverse member is lifted and rotated in order to remain parallel to the frame. A pivoting transverse member and a central transverse member attached to each other are rotated in order to be positioned underneath the frame. During the transport mode of operation, the set of retractable wheels must be lowered in order to become the rear axis of the seed planting apparatus.

During the operating mode, a pivotally retractable transverse member is lowered to the ground and rotated to be substantially perpendicular to the frame. A pivoting transverse member and a central transverse member attached to each other are rotated in order to be perpendicularly positioned to the frame. During the operating mode of operation, the set of retractable wheels must be raised as the transverse member wheels provide a mean to move the seed planting apparatus.

Other and further aspects and advantages of the present invention will be obvious upon an understanding of the illustrative embodiments about to be described or will be indicated in the appended claims, and various advantages not referred to herein will occur to one skilled in the art upon employment of the invention in practise. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel pivotally retractable seed planting apparatus will be described hereinafter. Although the invention is described in terms of specific illustrative embodiments, it is to be understood that the embodiments described herein are by way of example only and that the scope of the invention is not intended to be limited thereby.

Figure 1:
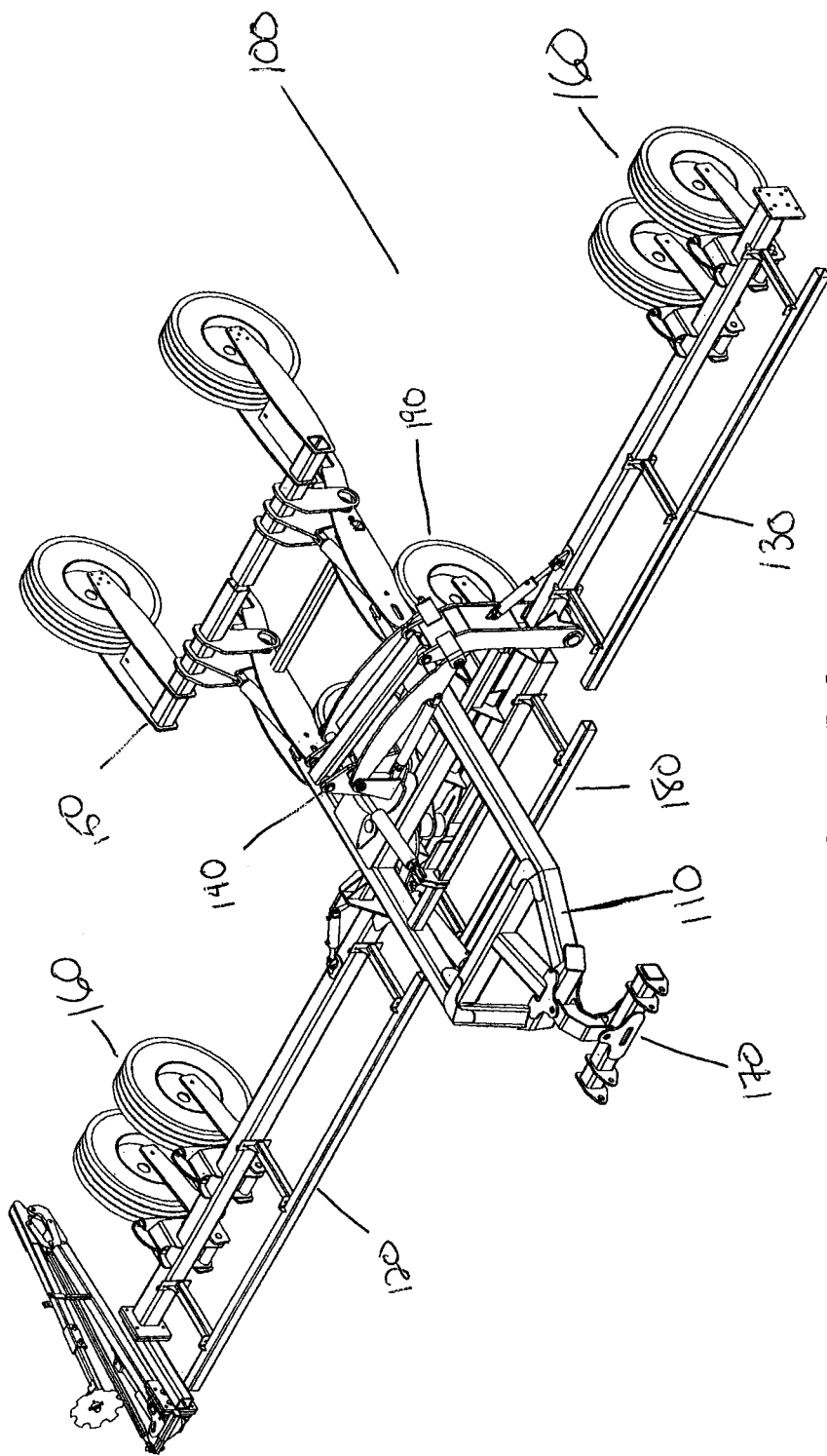
FIG. 1 is a front perspective view of a pivotally retractable seed planting apparatus shown in operational mode.

Referring to FIG. 1, presenting a preferred embodiment, a pivotally retractable seed planting apparatus 100 comprises a main frame assembly 110, a pivoting transverse member or arm 120, a pivotally retractable transverse member or arm 130, a lift system 140, at least one wheel, such as retractable wheel 150, at least one transverse member wheel, such retractable wheel 160, a hitching pole member 170, a central transverse member 180 and at least one frame wheel 190, such as a retractable wheel.

In another embodiment, the pivotally retractable seed planting apparatus 100 may comprises only a frame 110 and a pivotally retractable transverse member 130, thus allowing the seed planting apparatus 100 to be narrower when used in transport position. Furthermore the central transverse member 180 and pivoting transverse member 120 may be built as a unitary member or arm.

Figure 4:
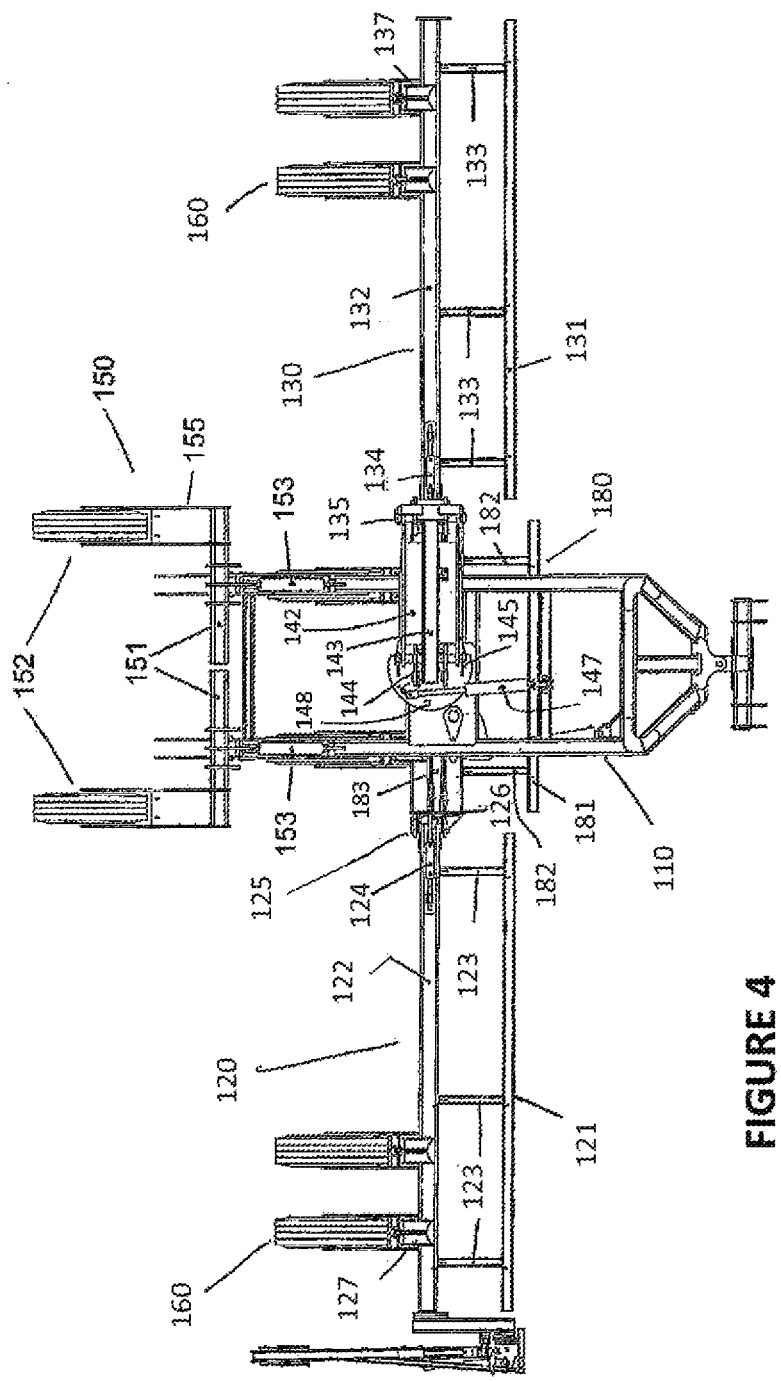
FIG. 4 is a top view of a pivotally retractable seed planting apparatus shown in operational mode.
Figure 5:
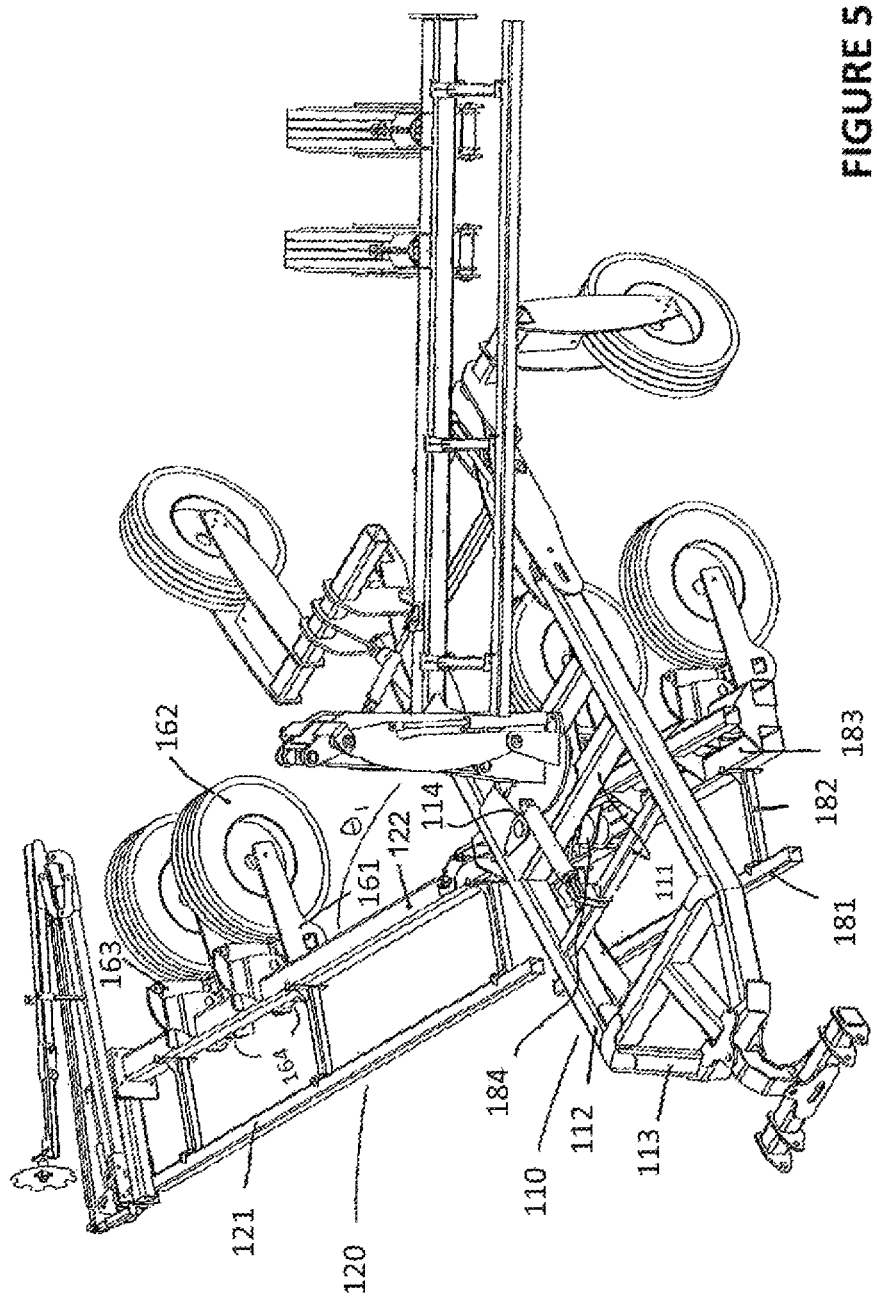
FIG. 5 is a front perspective view of a pivotally retractable seed planting apparatus shown during the collapsing or expanding mode of operation.
Figure 18:
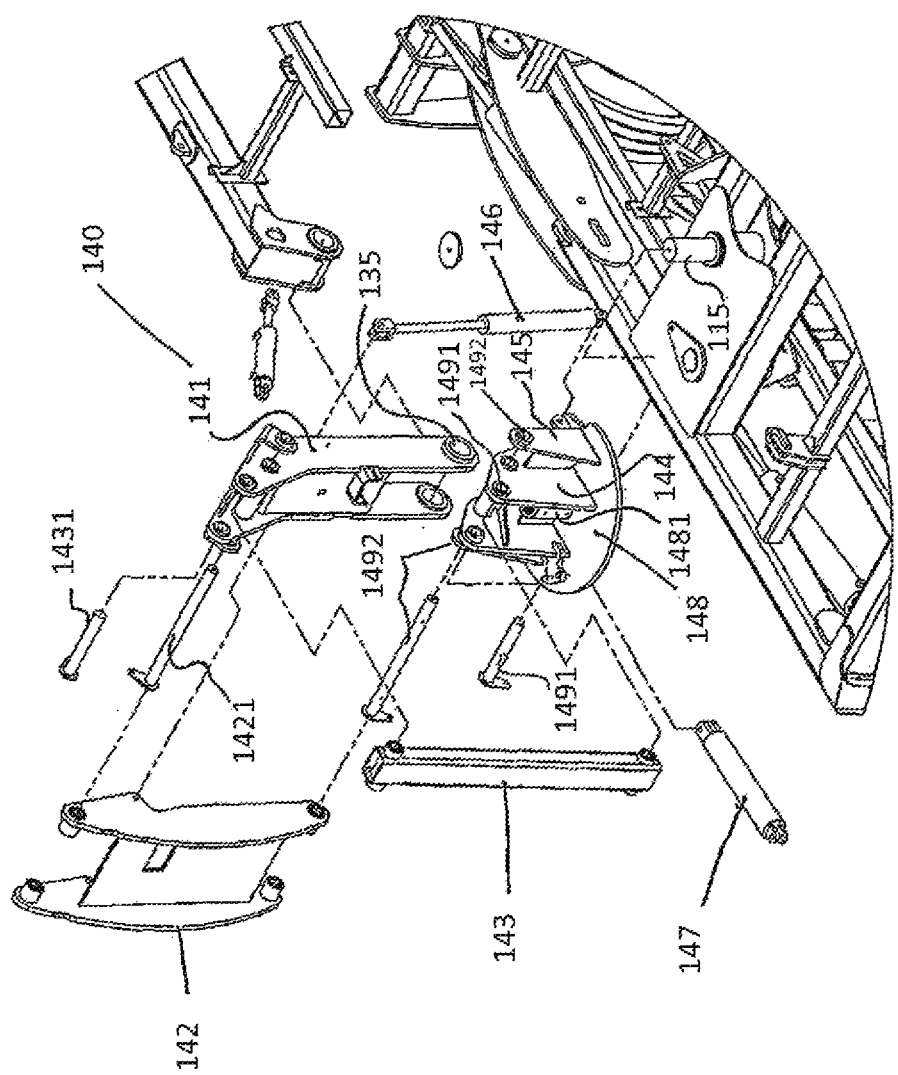
FIG. 18 is a perspective exploded view of a lift system of a pivotally retractable seed planting apparatus in accordance with the present invention.

Now referring to FIGS. 4, 5 and 18, a frame 110 having a generally rectangular shape is shown. A frame 110 comprises at least two longitudinal members 112, at least two transverse members 111, a front section 113 being attached to a hitching pole member 170, a pivot bracket 114 and a fixed shaft 115. A hitching pole member 170 allows the seed planting apparatus 100 to be towed by a motorized vehicle such as a farm tractor.

Figure 2:
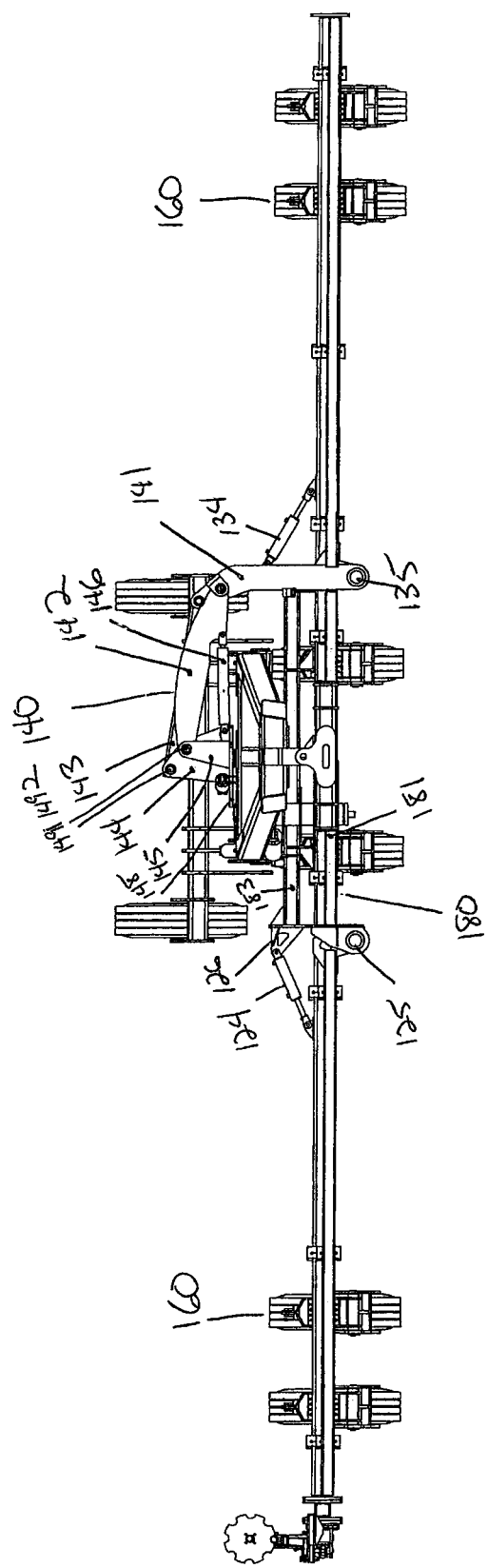
FIG. 2 is a front view of a pivotally retractable seed planting apparatus shown in operational mode.
Figure 6:
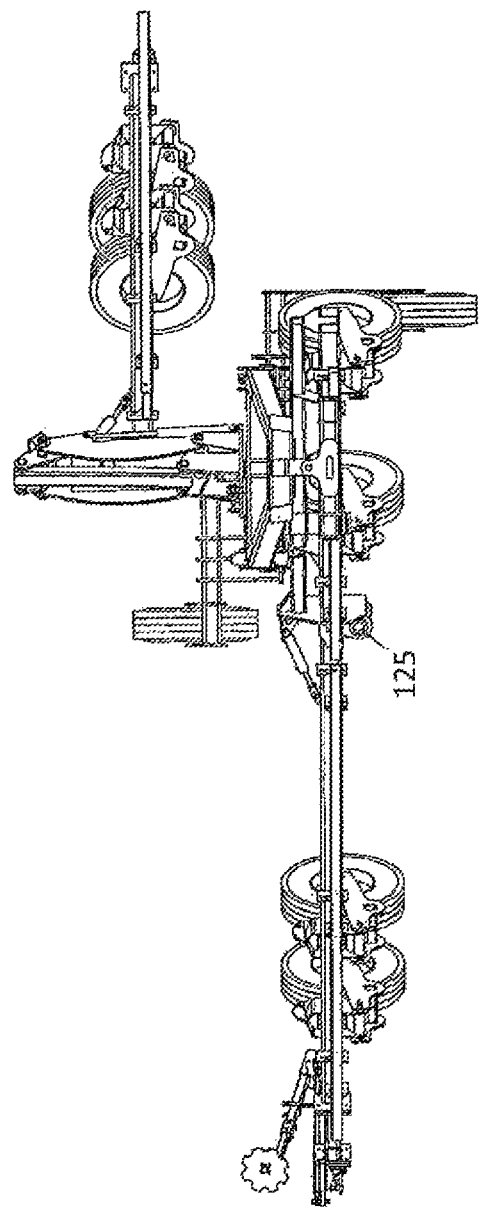
FIG. 6 is a front view of a pivotally retractable seed planting apparatus shown during the collapsing or expanding mode of operation.
Figure 7:
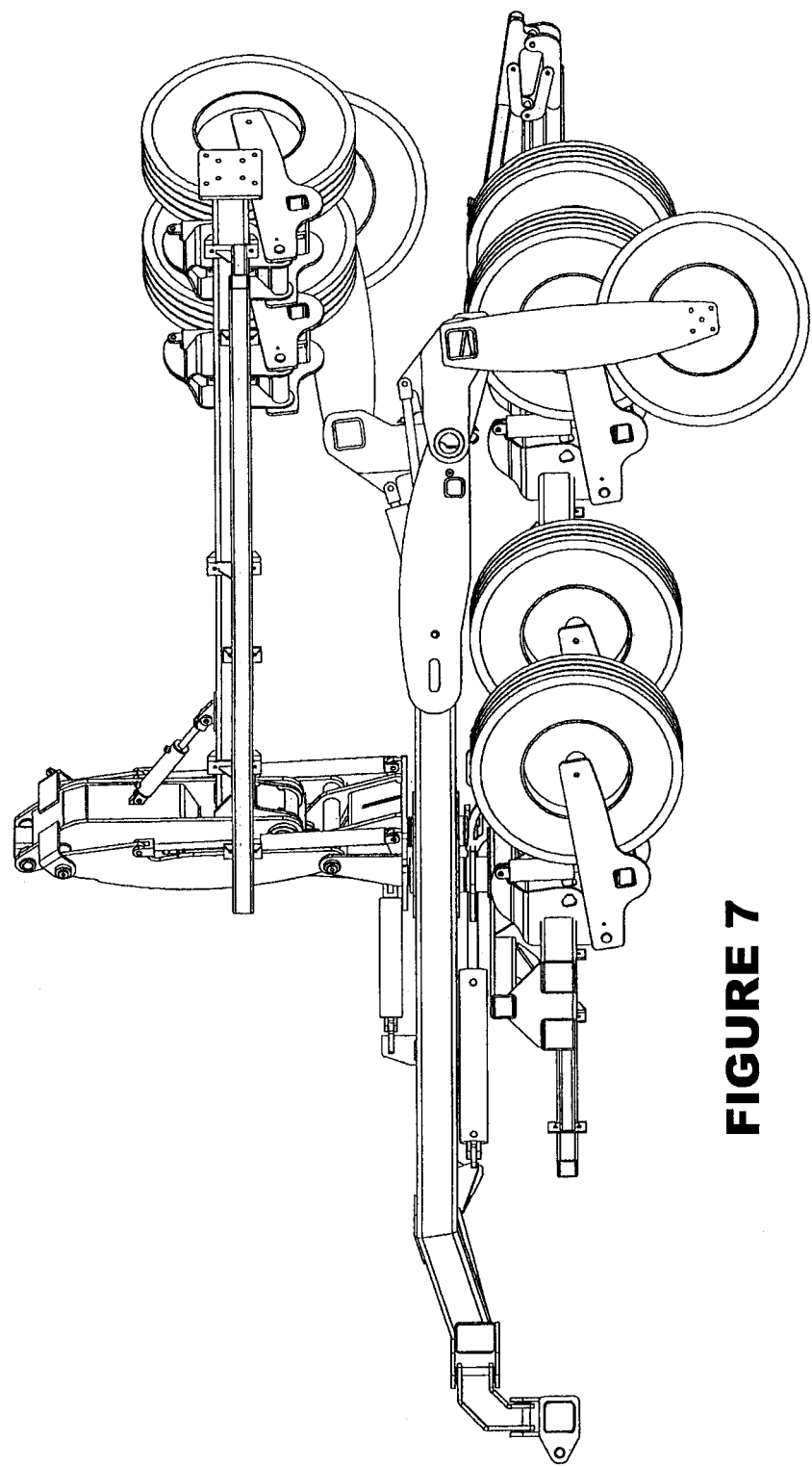
FIG. 7 is a side view of a pivotally retractable seed planting apparatus showing the side of a pivotally retractable transverse member during the collapsing or expanding mode of operation.
Figure 8:
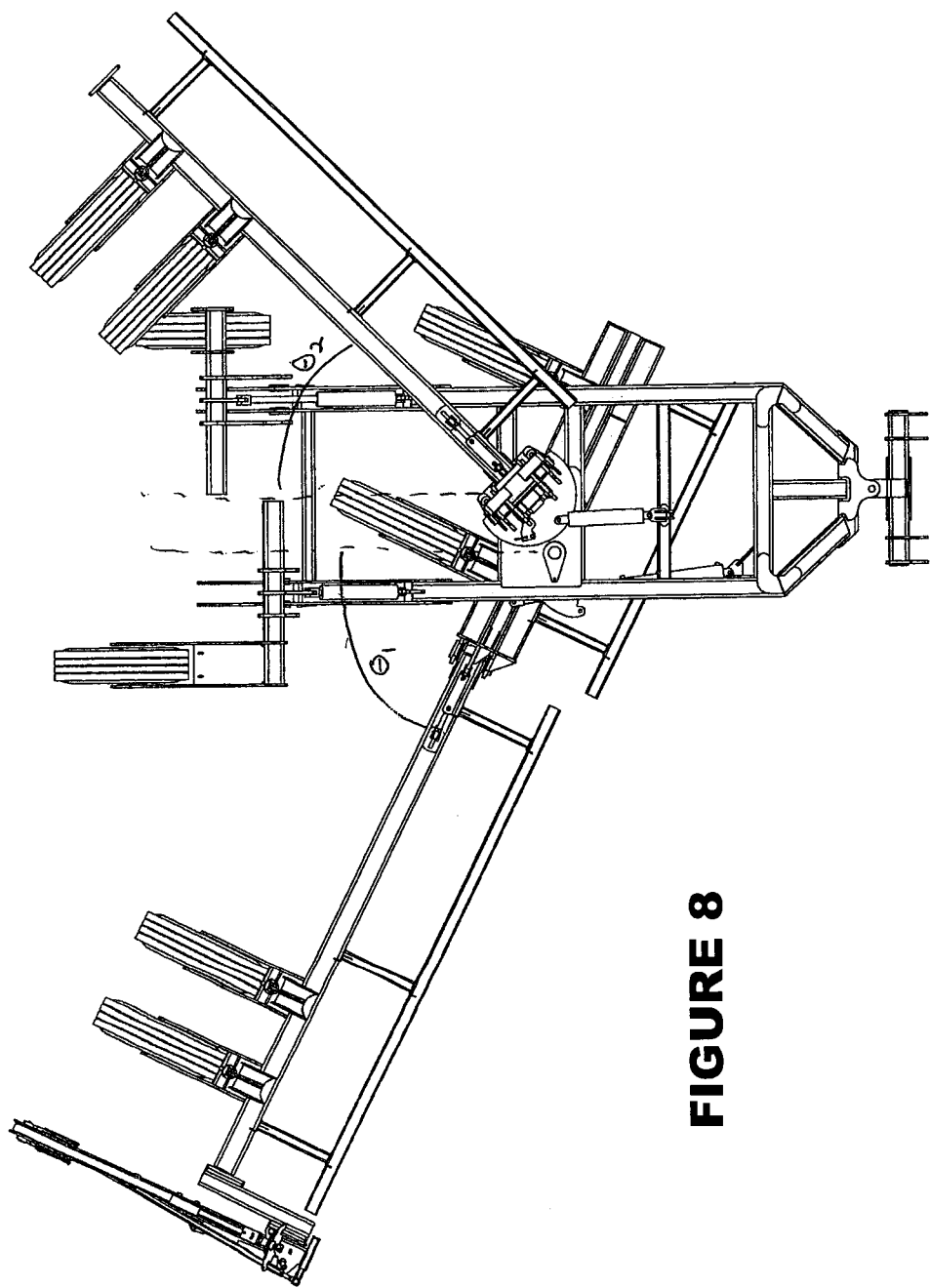
FIG. 8 is a top view of a pivotally retractable seed planting apparatus shown in collapsing or expanding mode of operation.
Figure 9:
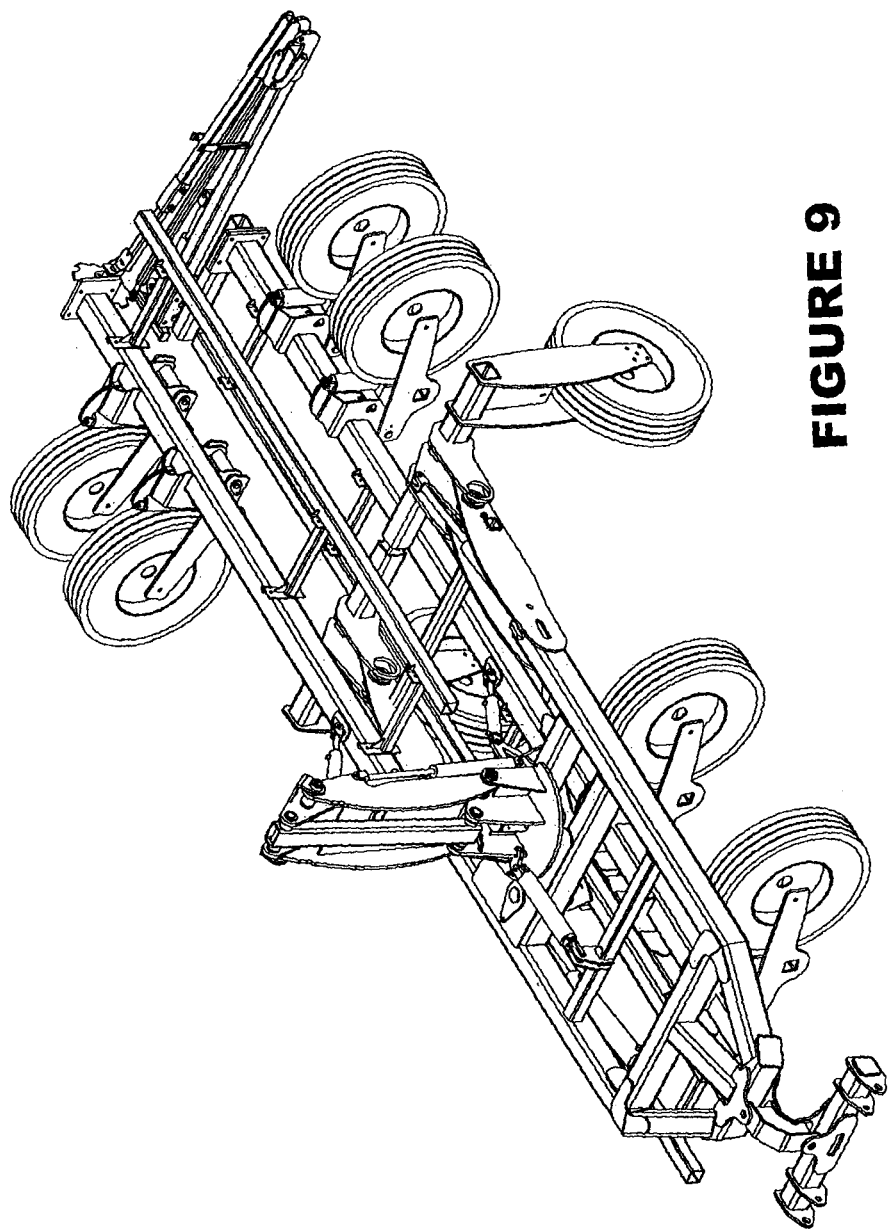
FIG. 9 is a front perspective view of a pivotally retractable seed planting apparatus shown during the transport mode of operation.
Figure 10:
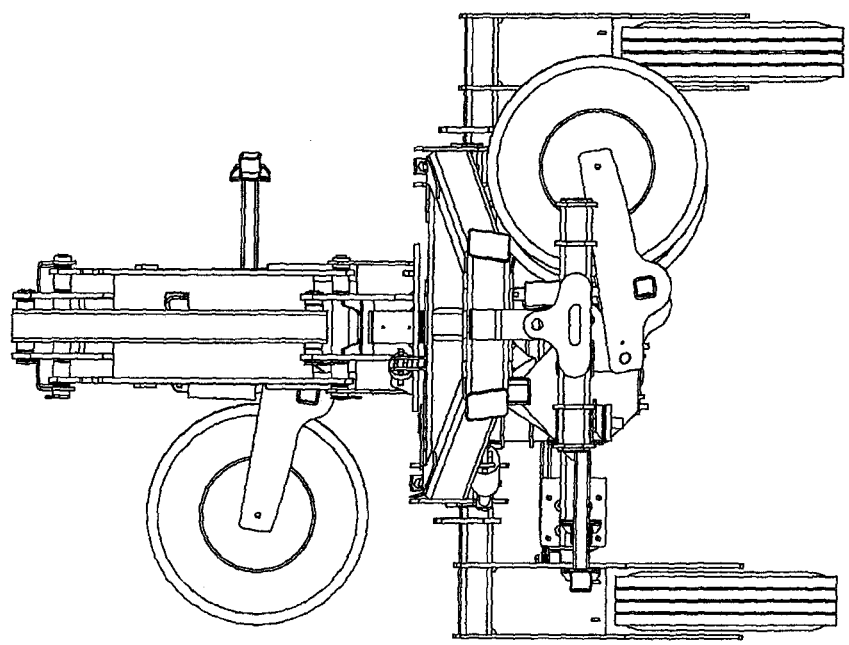
FIG. 10 is a front view of a pivotally retractable seed planting apparatus shown during the transport mode of operation.

Now referring to FIGS. 2, 4 and 6, a pivoting transverse frame member 120 attached to a pivotally retractable seed planting apparatus 100 is shown. A pivoting transverse member 120 comprises a front transverse member 121, a transverse frame member 122 and laterally connecting members 123, an actuator 124, a pivot shaft mounted in a pivot bracket 125 and an extension 126 of the frame 110 allowing the actuator 124 to be attached. The front transverse member 121 is maintained parallel to the transverse frame member 122 through a plurality of laterally connecting members 123 and allows the attachment of at least one fertilizer disk or any method allowing the drilling of the soil to plant fertilizer (not shown). The at least one transverse frame member 122 typically allows the attachment of at least one seed planting unit (not shown) to the seed planting apparatus 100. At least one transverse member wheel 160 is attached to the transverse frame 122 through a wheel connection frame extension 127. The pivoting transverse member 120 is attached to the central transverse member 180 through a pivot shaft mounted in a pivot bracket 125 (refer to FIG. 6 for best perspective). The actuator 124 is connected to the transverse frame member 122 and to an extension 126 of the central transverse member 180 using a retaining method such as bolts and nuts. The pivoting mean of the transverse member 120, comprising the pivot shaft 125 and the actuator 124 allows the member 120 to adapt to the relief of the land in order to maintain a constant seeding process.

Figure 11:
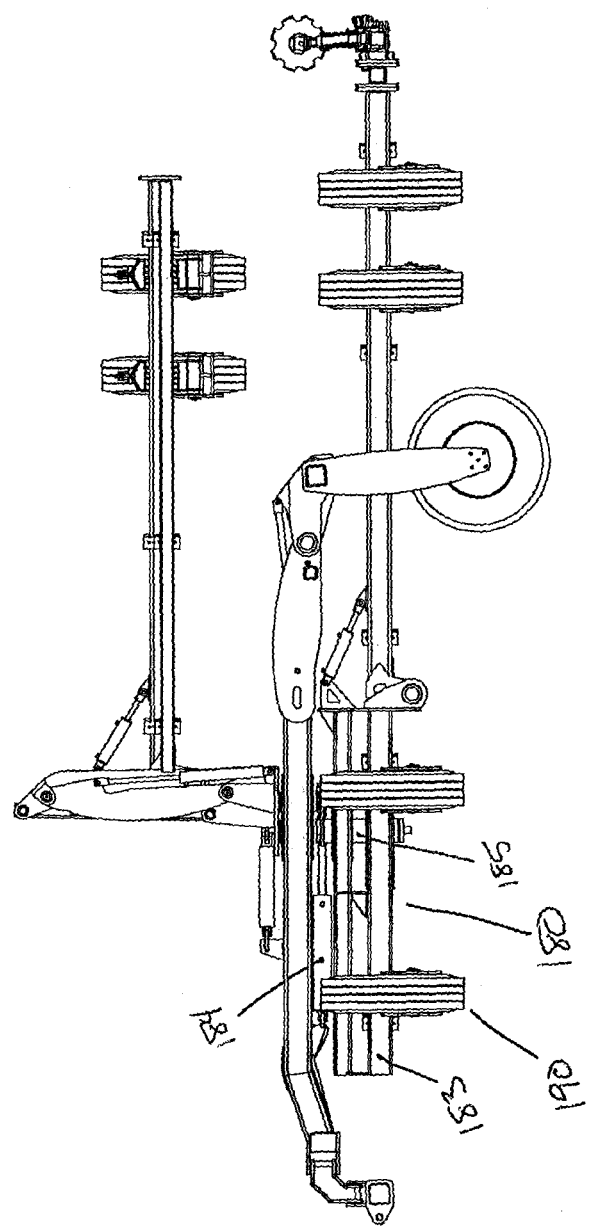
FIG. 11 is a side view of a pivotally retractable seed planting apparatus showing the side of a pivotally retractable transverse member during the transport mode of operation.
Figure 12:
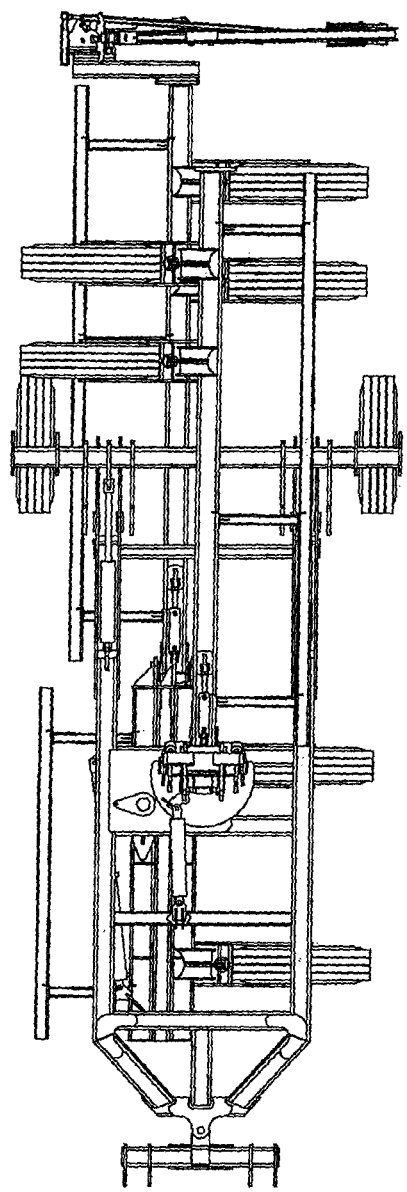
FIG. 12 is a top view of a pivotally retractable seed planting apparatus shown in transport mode of operation.
Figure 13:
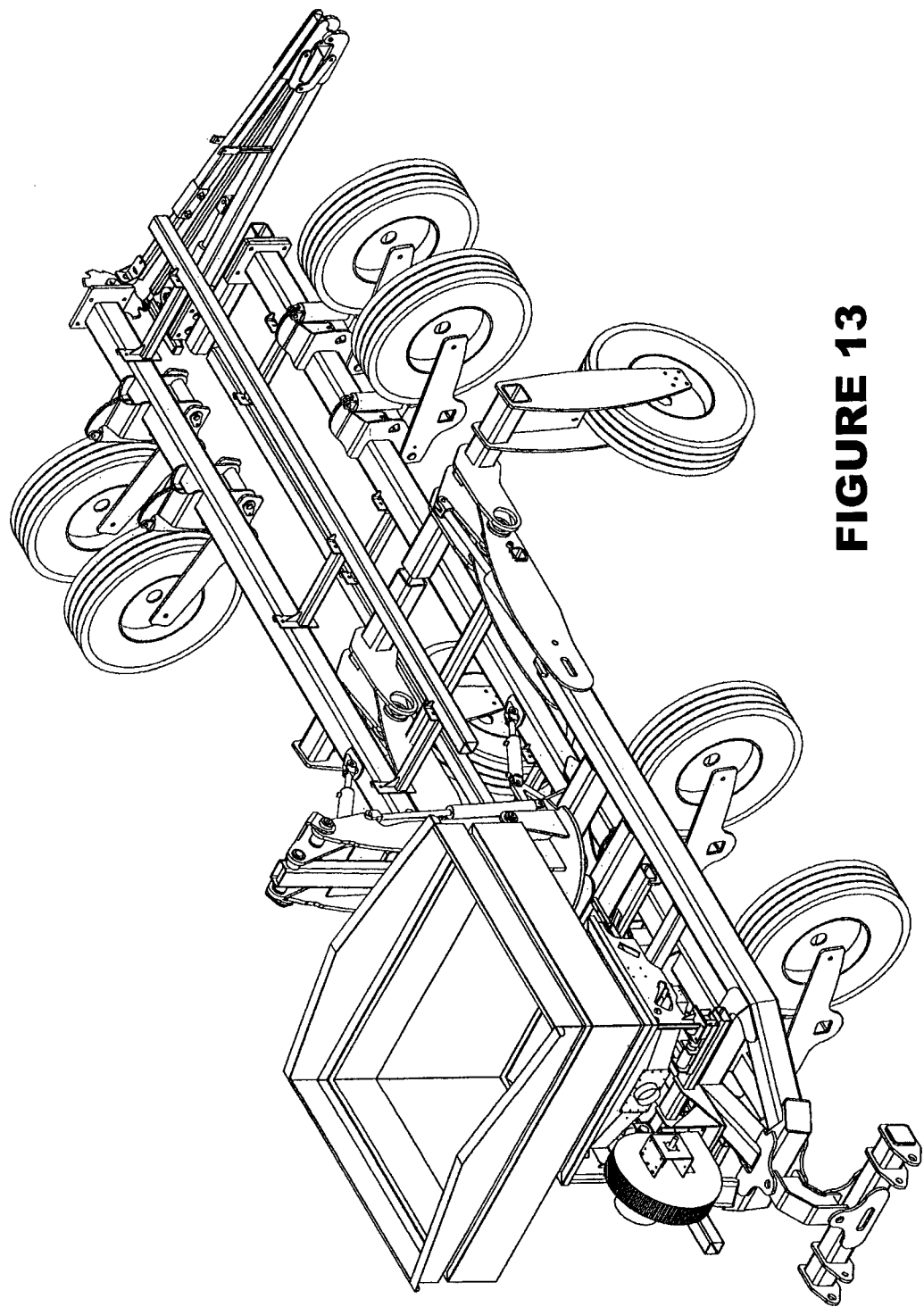
FIG. 13 is a front perspective of a pivotally retractable seed planting apparatus with a seed distribution system shown in transport mode of operation.

Now referring to FIGS. 2, 4 and 11, a central transverse member 180 allowing the rotation around a substantially vertical axis perpendicularly positioned in relation with the frame 110 is shown. The central transverse member 180 comprises a front transverse member 181, at least one laterally connecting member 182, a transverse frame member 183, at least one actuator 184 and a pivot shaft mounted in at least one pivot bracket 185. The front transverse member 181 allows the attachment of at least one fertilizer disk or any method allowing the drilling of the soil to plant fertilizer (not shown). The at least one transverse frame member 183 typically allows the attachment of at least one seed planting unit (not shown) to the seed planting apparatus 100. The central transverse member 180 may rotate around a vertical axis defined by the pivot shaft 185. The actuator 184 creates motion at the tangent of the pivot shaft 185 which produce a rotation motion and allows the central transverse member 180 and the connected transverse member 120 to rotate under the frame 110.

Now referring to FIGS. 2 and 4, a pivotally retractable transverse member 130 attached to a pivotally retractable seed planting apparatus 100 is shown. Similarly to a pivoting transverse member 120, a pivotally retractable transverse member 130 comprises a front transverse member 131, a transverse frame member 132 and laterally connecting members 133, an actuator 134 and a pivot shaft mounted in a pivot bracket 135. The front transverse member 131 is maintained parallel to the transverse frame member 132 through a plurality of laterally connecting members 133 and allows the attachment of at least one fertilizer disk or any method allowing the drilling of the soil to plant fertilizer (not shown). The at least one transverse frame member 132 typically allows the attachment of at least one seed planting unit (not shown) to the seed planting apparatus 100. At least one transverse member wheel 160 is attached to the transverse frame 132 through a wheel connection frame extension 137. The retractable transverse member 130 is attached to the frame 110 through the lift system 140. A pivot shaft mounted in a pivot bracket 135 allows the pivotally retractable transverse member 130 to pivot around an axis perpendicular to the frame 110. The actuator 134 is connected to the transverse frame member 132 and to a member of the lift system 140 using a retaining method such as bolts and nuts.

Similarly to the pivoting transverse member 120, the pivoting mean of the retractable transverse member 130, comprising the pivot shaft 135 and the actuator 134, allows the retractable member 130 to adapt to the relief of the land in order to maintain a constant seeding process.

Now referring to FIGS. 2, 3, 4 and 18, a lift system 140 allowing the retractable transverse member 130 to be lifted and rotated around a substantially vertical axis (not shown) is presented. The lift system 140 allows the pivoting transverse member to be lifted and to be retracted over the frame 110. The lift system 140 comprises at least one longitudinal member 141 attached to a retractable transverse member 130, at least one external lifting member 142, at least one pushing member 143, a pushing member bracket 144, at least one lifting member bracket 145, at least one lifting actuator 146, at least one rotating actuator 147 and a rotating platform 148.

The rotating platform 148 comprises a generally cylindrical opening 1481 configured for receiving the fixed shaft 115 and allowing the rotating of the platform around the shaft 115 axis. When activated, the rotating actuator 147 provides a rotating motion to the rotating platform 148. The rotation motion direction depends on the side of the installation of the retractable transverse member 130. In the present embodiment, the motion direction is counter clockwise in order to position the pivoting transverse member 130 over the frame 110. The at least one pushing member bracket 144 and the at least one lifting member bracket 145 are attached to the rotating platform 148 using any retaining method, such as bolt or welding. Each bracket 144 and 145 comprises at least one pivot shaft mounted in a pivot bracket 1491 and 1492. The pivot bracket 1491 allows a pushing member 143 to rotate around the pivot bracket 1491 axis. Similarly, the pivot bracket 1492 allows an external lifting member 142 to rotate around the pivot bracket 1492 axis. The at least one actuator 146 connects the rotating platform 148 to the external lifting member 142 and allows a lifting motion of the external lifting member 142. The longitudinal member 141 is generally shaped as an elongated V. One end of the longitudinal member 141 is independently attached to both a pushing member 143 and an external lifting member 142 using a rotating attaching method such as a pivot shaft mounted in a pivot bracket 1421 or 1431. The other end of the longitudinal member 141 is attached to the retractable transverse member 130 using a rotating attaching method 135 such as pivot shaft mounted in a pivot bracket.

In another embodiment, the axis of rotation of the central transverse member 180 may be laterally offset from the axis of rotation of the pivotally retractable transverse member 130. In a further embodiment, the axis of rotation of the pivoting transverse member 120 may be laterally offset from the axis of rotation of the pivotally retractable transverse member 130.

During the lifting motion, the pushing member 143 forces the longitudinal member 141 to remain vertical, thus insuring that the retractable transverse member 130 remains in a generally horizontal position.

Figure 3:
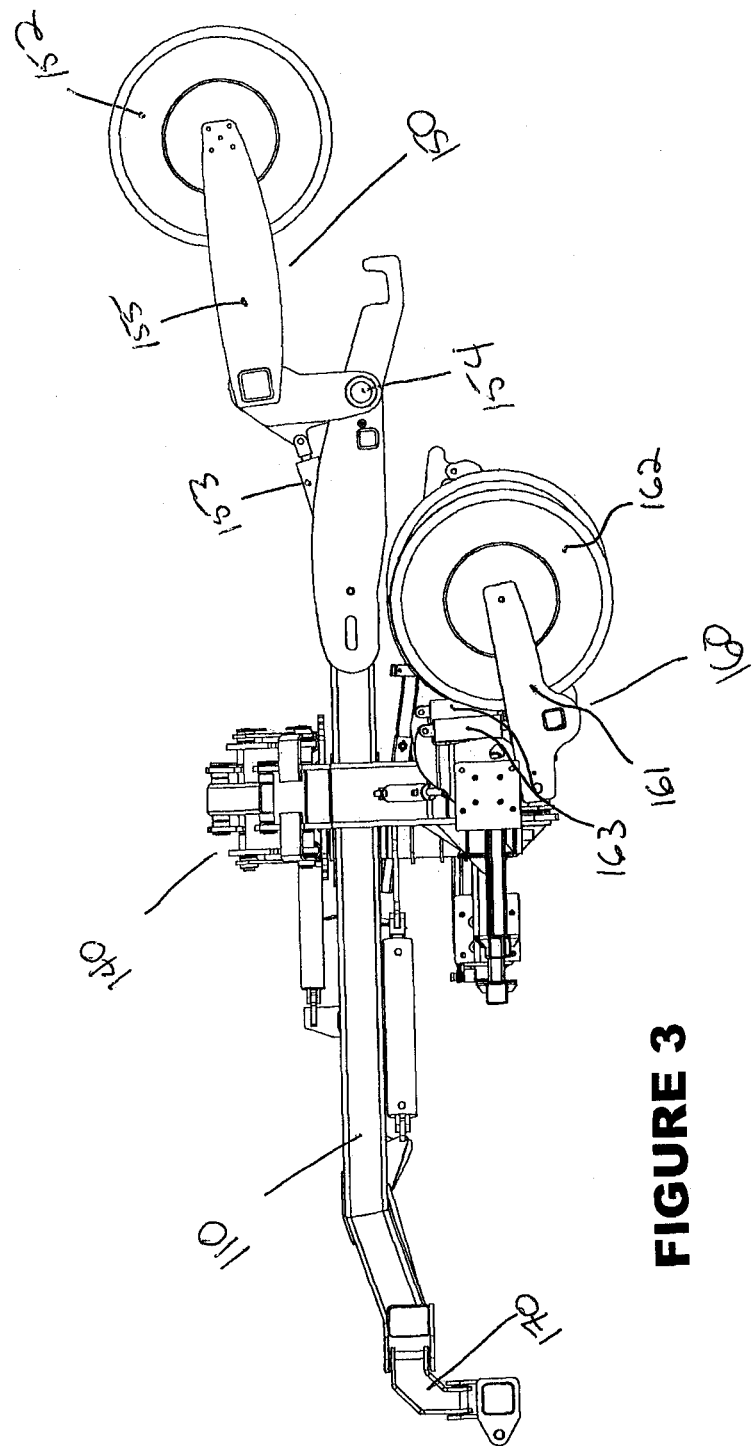
FIG. 3 is a side view of a pivotally retractable seed planting apparatus shown in operational mode and showing the side of a pivotally retractable transverse member.
Figure 14:
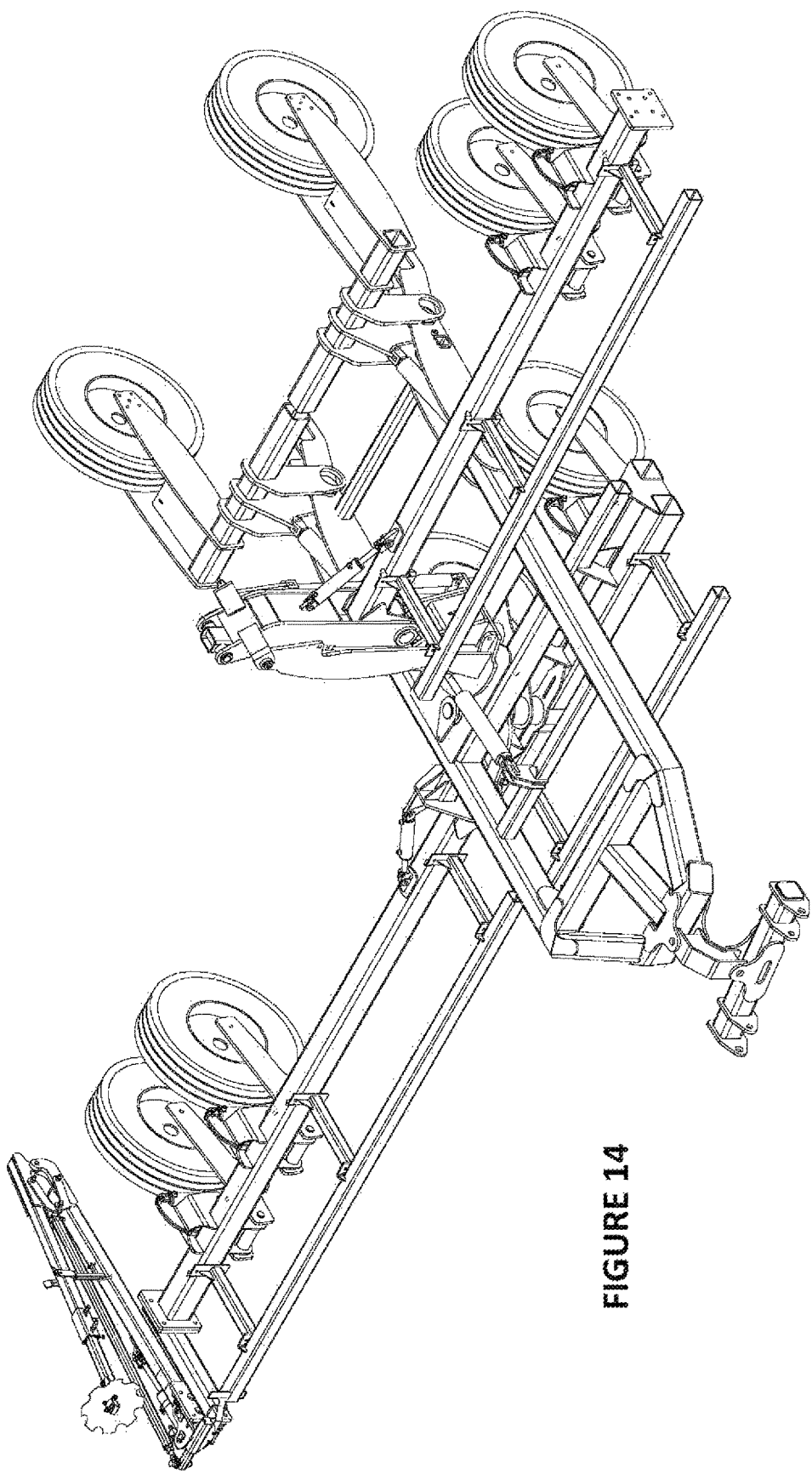
FIG. 14 is a front perspective of a pivotally retractable seed planting apparatus shown in collapsing or expanding mode of operation during the retraction of the pivotally retractable transverse member.
Figure 15:
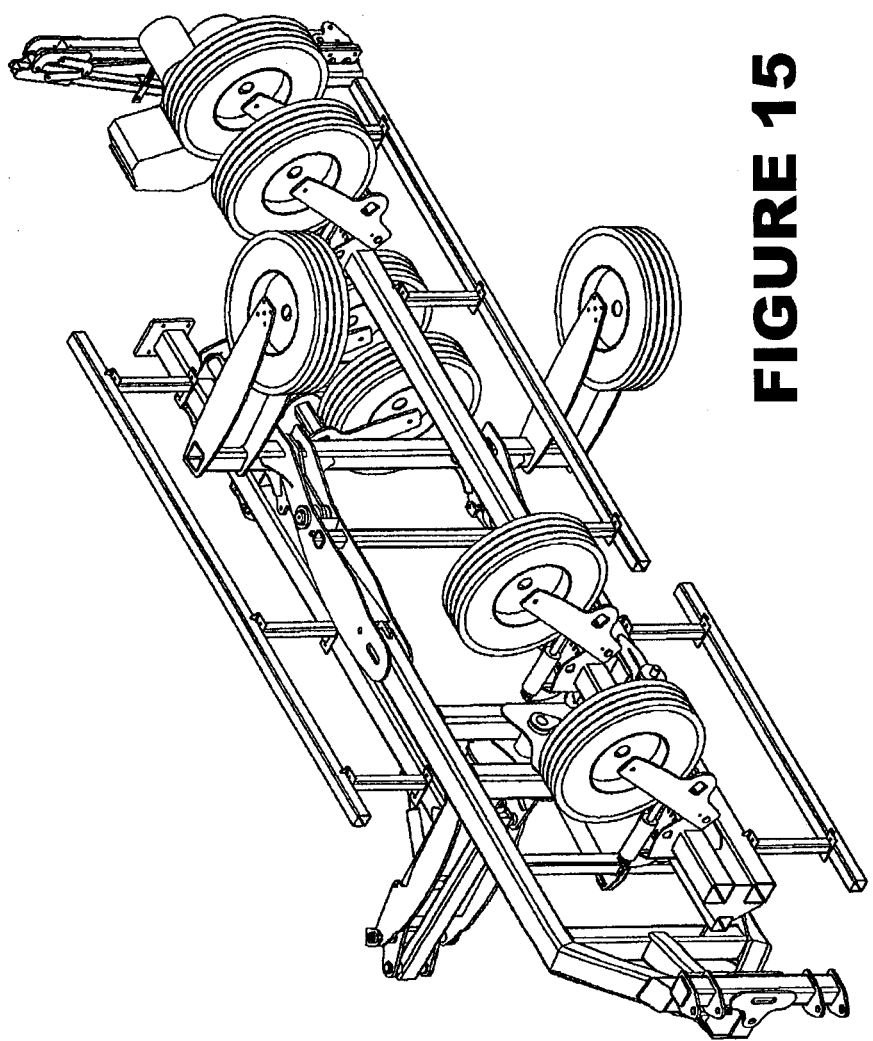
FIG. 15 is a bottom perspective view of a pivotally retractable seed planting apparatus shown during the transport mode of operation.
Figure 16:
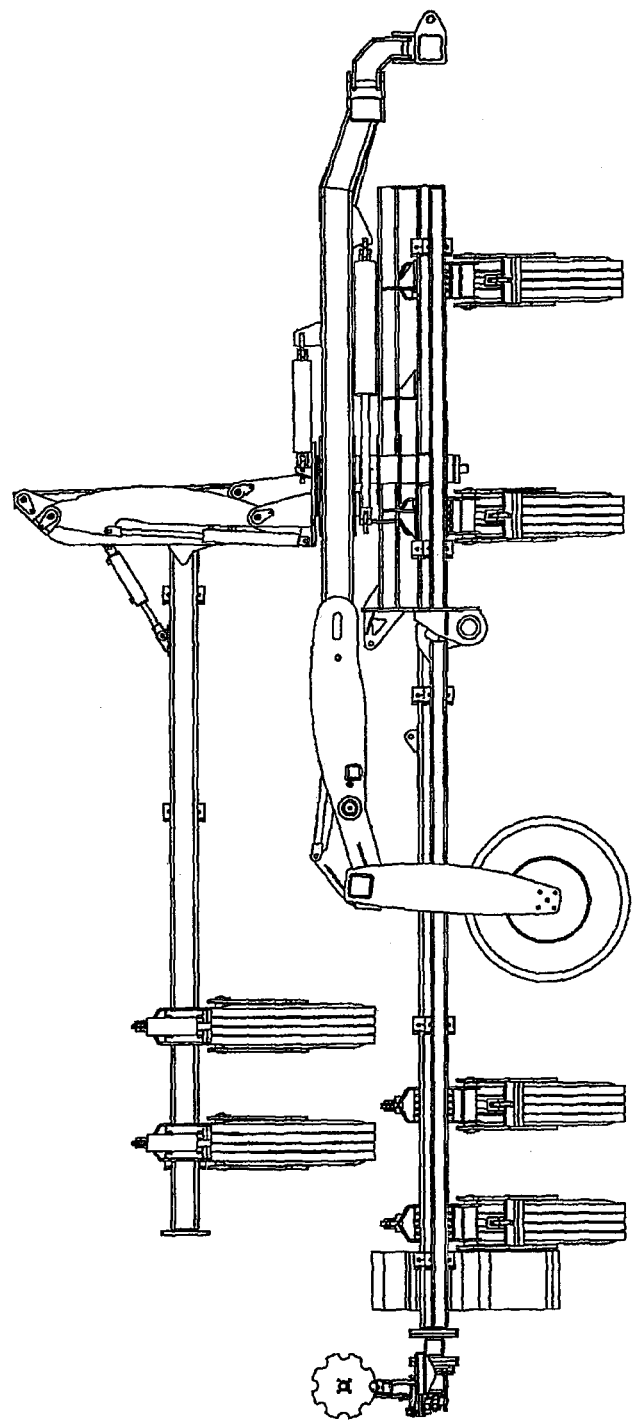
FIG. 16 is a side view of a pivotally retractable seed planting apparatus showing the side of a pivotally transverse member during the transport mode of operation.
Figure 17:
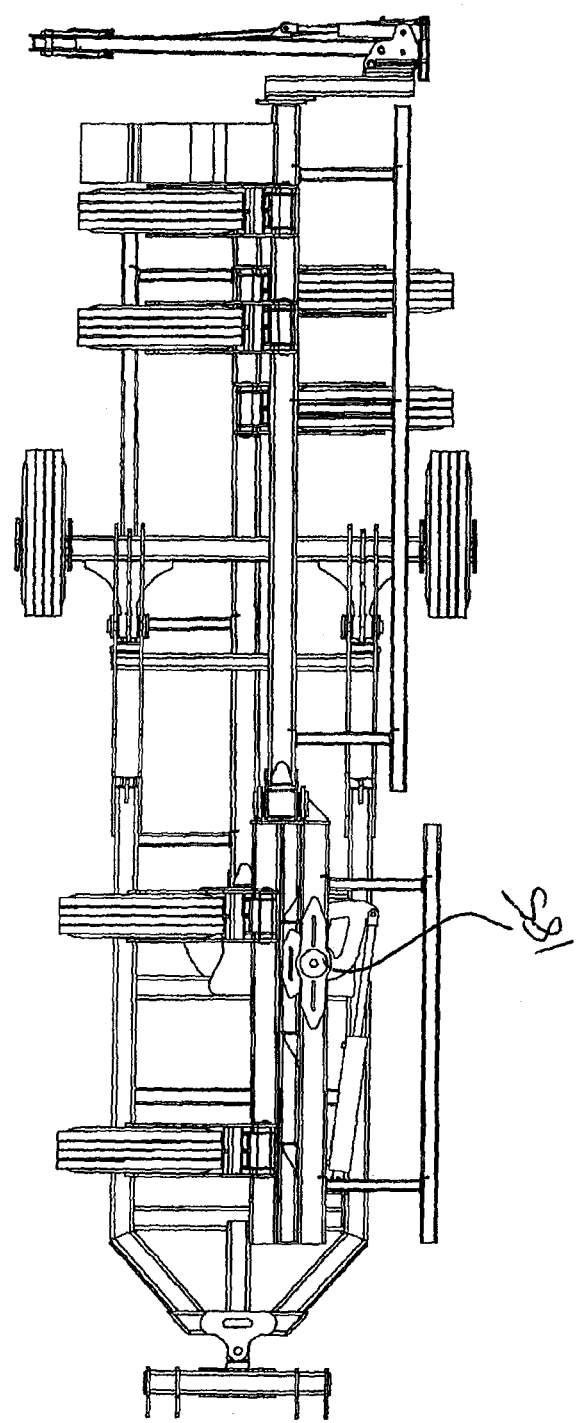
FIG. 17 is a bottom view of a pivotally retractable seed planting apparatus shown during the transport mode of operation.

Now referring to FIGS. 3, 4 and 14, at least one independent retractable wheel 150 is shown. Each retractable wheel comprises a transverse member 151, at least one wheel 152, at least one actuator 153 and a pivot shaft mounted in at least one pivot bracket 154. In the present embodiment, the at least one wheel 152 is attached to a longitudinal member 155. The longitudinal member 155 is affixed to the transverse member 151. In another embodiment, any retaining mean may be used to attach a wheel 152 to the transverse member 151. The pivot shaft 154 allows a retractable wheel 152 to rotate around an axis parallel to a transverse member 151 and the at least one actuator 153 allows such rotation motion.

Now referring to FIGS. 3 and 5, a plurality of transverse member wheel 160 allowing a transverse member 120 or 130 to be raised or lowered from the ground level. Each wheel 162 is attached to a wheel bracket 161, said wheel bracket 161 being attached to a transverse frame member 122, 132 or 183 through a rotating attaching mean 164. The raising or lowering motion is created by at least one actuator 163. A wheel 162 may be built using any material allowing transport on soft or hard surface, such as soil from a field or tarmac on a road.

Now referring to FIGS. 4, 5, 8, 11 and 17, a central transverse member 180 is shown. A central transverse member 180 comprises at least one front transverse member 181, at least one laterally connecting member 182, a transverse frame member 183 and a pivot shaft mounted in a pivot bracket 184. The central transverse member 180 may rotate around a generally vertical axis, perpendicular to the frame 110. A pivot shaft being mounted into the pivot bracket 185 of the central transverse member 180 and a pivot bracket 114 of the frame 110 allows the central transverse member 180 to rotate around a vertical axis in order to collapse or expand the pivotally retractable seed planting apparatus 100. The angle $\Theta_1$ between the central transverse member 180 and the attached retractable transverse member 130 shall range between 0 and 90 degrees. An angle $\Theta_1$ of circa 0 degrees represents the transport position of the planting apparatus 100. An angle $\Theta_1$ of circa 90 degrees represents the seeding or planting position.

In the present embodiment, the pivotally retractable seed planting apparatus 100 may be used to plant seeds in areas where road are narrow or where geographical features or relief of a field does not allow a non-foldable or larger retractable seed planting apparatus to be used. A pivotally retractable seed planting apparatus 100 may be used through at least four modes of operation, the transportation mode, the collapsing mode, the operating mode and the expanding mode.

Now referring to FIGS. 1, 2 and 4, the pivotally retractable seed planting apparatus 100 is shown in operating mode. Both transverse members 120 and 130 are expanded and are perpendicularly aligned with the frame 110. During this mode of operation, the at least one independent retractable wheel 150 shall be retracted. In the retracted position, the at least one independent retractable wheel 150 shall not be in contact with the ground.

Now referring to FIGS. 5, 6, 7, 8 and 14, the pivotally retractable seed planting apparatus 100 is shown during collapsing or expanding mode. More specifically, the FIGS. 5, 6, 7 and 8 show the first step of the expanding mode or the last step of the collapsing mode. At this point, both transverse members 120 and 130 are pivoting around a generally vertical axis and perpendicular to the apparatus frame 110 as previously described. The rotation motion allows the angles $\Theta_1$ and $\Theta_2$ to vary from circa 0 degrees to circa 90 degrees during expanding mode and to vary from circa 90 degrees to circa 0 degrees during collapsing mode. During both the expanding and the collapsing mode, the independent retractable wheel 150 located on the side of the pivoting transverse member 120 shall be in retracted position to allows the pivoting transverse member 120 to be pivot underneath the frame 110. At least one other independent retractable wheel 150 located on the same side as the pivotally retractable transverse member 130 shall be expanded or lowered to allow the apparatus 100 to be supported on the ground during the collapsing or expanding mode.

Now referring to FIG. 14, the pivotally retractable seed planting apparatus 100 is shown during the lifting phase of the collapsing mode or the lowering phase of the expanding mode. At this time, the angles $\Theta_1$ and $\Theta_2$ must remain at circa 90 degrees. The lift system 140 allows the different members 142, 143 and 141 to lift or lower the retractable transverse member 130 from/to the operating mode position by activating or compressing the at least one actuator 146.

Now referring to FIGS. 9 to 13, the pivotally retractable seed planting apparatus 100 is shown in transportation mode. During this mode, at least two wheels from the at least one independent retractable wheel 150 shall be in expanded position in order to maintain stability of the apparatus 100 during transport and to increase the clearance of the apparatus with the ground in order to pull the wheels 160 from the ground. The pivoting transverse member 120 and the attached central transverse member 180 shall be completely folded underneath the frame 110, thus having an angle $\Theta_1$ of circa 0 degree between the members 120 and 180 and the frame 110. The retractable transverse member 130 shall be completely folded over the frame 110, thus having an angle $\Theta_2$ of circa 0 degrees between the members 130 and 180 and the frame 110.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A pivotally retractable seed planting apparatus comprising:
    a main frame assembly adapted in use to be towed by or attached to the rear of a vehicle, the main frame assembly comprising at least one first wheel mounted thereto;
    a pivotally retractable transverse member connected to the main frame assembly, the pivotally retractable transverse member comprising:
        a first transverse frame member;
        a pivot mechanism configured to rotate the first transverse frame member in relation to the main frame assembly;
        a lift system configured to lift the first transverse frame member; and
        at least one second wheel mounted thereto;
    a central transverse member connected to the main frame assembly, the central transverse member comprising:
        a second transverse frame member; and
        a pivot mechanism configured to rotate the second transverse frame member in relation to the main frame assembly; and
    a pivoting transverse member connected to the central transverse member, the pivoting transverse member comprising:
        a third transverse frame member; and
        at least one third wheel mounted thereto;
    wherein in a transportation mode the pivotally retractable transverse member extends over the main frame assembly; and
    wherein in the transportation mode the pivoting transverse member extends underneath the main frame assembly, the main frame assembly comprising at least one retractable wheel to allow passage of the pivoting transverse member.

2. A pivotally retractable seed planting apparatus as claimed in claim 1, wherein the pivoting transverse member is connected to the central transverse member with another pivot mechanism.

3. A pivotally retractable seed planting apparatus as claimed in claim 1, wherein the pivotally retractable transverse member and the pivoting transverse member are configured to pivot in relation to the main frame assembly from a substantially perpendicular position to a substantially parallel position.

4. A pivotally retractable seed planting apparatus as claimed in claim 1, wherein the central transverse member is configured to pivot in relation to the main frame assembly from a substantially perpendicular position to a substantially parallel position.

5. A pivotally retractable seed planting apparatus as claimed in claim 1, wherein the pivotally retractable seed planting apparatus further comprises at least one front transverse member.

6. A pivotally retractable seed planting apparatus as claimed in claim 5, wherein the at least one front transverse member is maintained parallel to the at least one of the first transverse frame member, the second transverse frame member, the third transverse frame member or the central transverse member through a at least one laterally connecting member.

7. A pivotally retractable seed planting apparatus as claimed in claim 1, wherein any of the at least one first wheel, the at least one second wheel and the at least one third wheel is independently retractable.

8. A pivotally retractable seed planting apparatus as claimed in claim 1, wherein a raising or lowering motion of the pivotally retractable transverse member is created by at least one actuator.

9. A pivotally retractable seed planting apparatus as claimed in claim 1, wherein the pivot mechanisms are actuated by at least one actuator.

10. A pivotally retractable seed planting apparatus as claimed in claim 1, wherein at least one of the pivot mechanisms are actuated by at least one actuator.

11. A pivotally retractable seed planting apparatus as claimed in claim 10, wherein the at least one actuator is a hydraulic cylinder.

12. A pivotally retractable seed planting apparatus as claimed in claim 1, wherein an axis of rotation of the pivoting transverse member is laterally offset from an axis of rotation of the pivotally retractable transverse member.

13. A pivotally retractable seed planting apparatus as claimed in claim 1, wherein an axis of rotation of the central transverse member is laterally offset from an axis of rotation of the pivotally retractable transverse member.

14. A pivotally retractable seed planting apparatus as claimed in claim 1, wherein any of the at least one first wheel, the at least one second wheel, and the at least one third wheel are adapted to move from an operational mode to the transportation mode.

* * * * *